Sept. 17, 1957 C. S. SCHROEDER 2,806,619
PLATFORM PIVOTING AND SLIDING CONSTRUCTION FOR LIFT TRUCK
Filed Jan. 4, 1955 3 Sheets-Sheet 1

INVENTOR.
C. S. Schroeder
BY
ATTORNEY

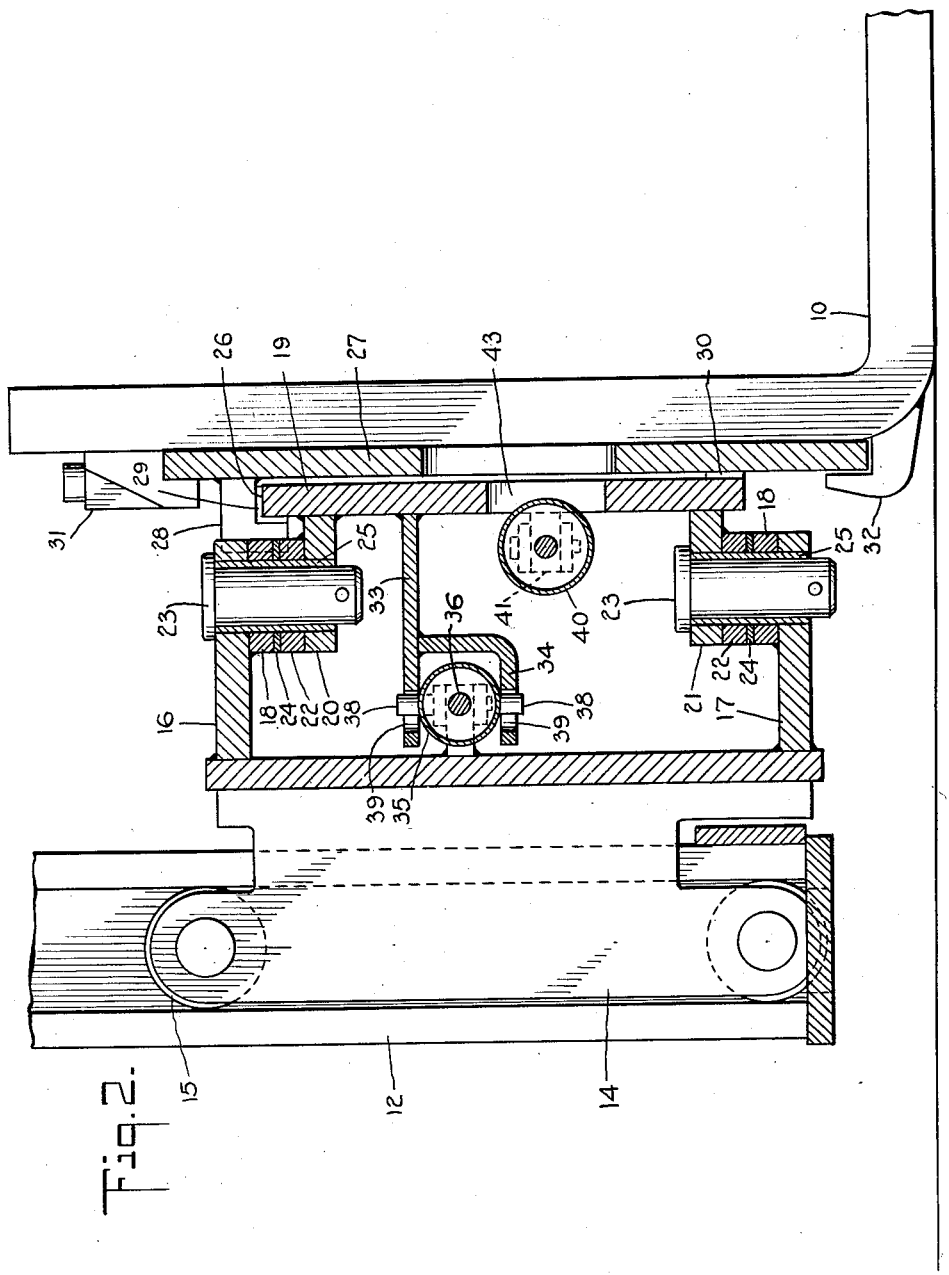

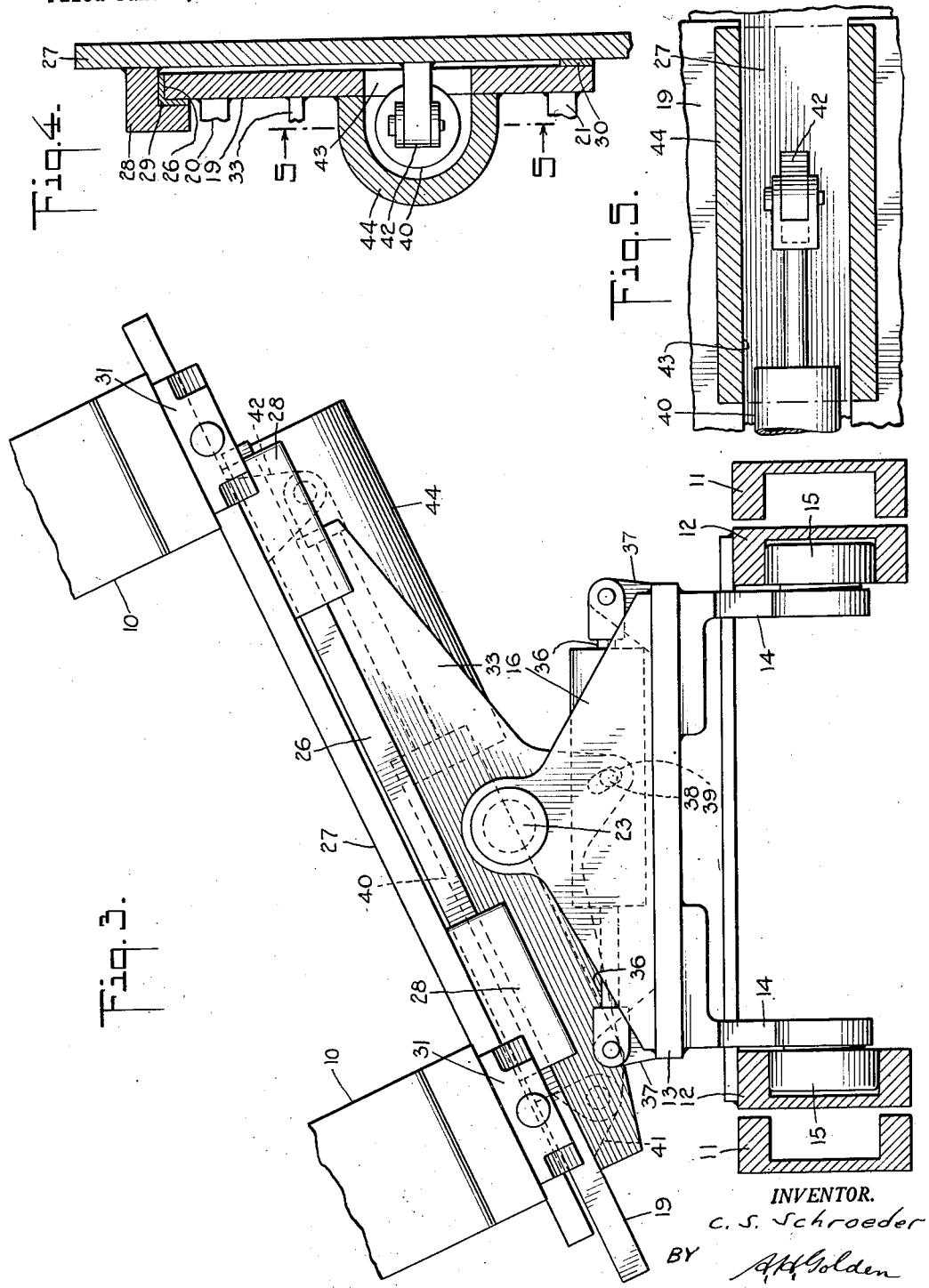

2,806,619

PLATFORM PIVOTING AND SLIDING CONSTRUCTION FOR LIFT TRUCK

Charles S. Schroeder, Wynnewood, Pa., assignor to The Yale & Towne Manufacturing Company, Stamford, Conn., a corporation of Connecticut Application January 4, 1955, Serial No. 479,697

7 Claims. (Cl. 214—730)

This invention relates to industrial trucks of the type in which a load platform is adapted for lateral movement relatively to both a load and the truck for putting the platform in position for picking up the load as the platform is elevated. More particularly, this invention relates to a load platform of the type formed by two or more spaced forks.

It has heretofore been suggested by many skilled in the art that forks forming a platform be adapted for pivotal movement to facilitate the positioning of the truck and platform relatively to loads in narrow aisles, and the movement of the truck around corners in such narrow aisles. The pivotal movement of the forks is also effective frequently for aligning the forks relatively to a load where it is impossible or difficult to move the entire truck so as to manipulate the forks relatively to the load.

As a feature of my invention, I provide a truck of the class described in which sliding forks are pivoted through the member on which they are slidable so as to better adapt them for location relatively to a load and for facilitating the movement of the truck around corners in narrow aisles. As a feature of the invention, the sliding of the forks takes place on a member that is pivotally mounted relatively to the carriage of the truck so that the pivot axis is relatively close to the truck allowing for a more effective pivoting of the forks, while the sliding of the forks relatively to the pivot axis allows for a positioning of the forks relatively to the load after the pivotal movement has taken place.

I have found that this basic concept of the sliding of the forks relatively to a pivoting member effects a far superior positioning control of the forks than through other pivotal and sliding relationships such as those found in the prior art.

Through my concept, for example, it is possible to slide the forks in a direction at right angles to their length regardless of the rotated position of the forks on the pivoting member. In the prior art the forks can only be shifted in one line relatively to the truck. This feature of my truck aids materially in the placing of the forks relatively to a load. In my invention, should the load be accepted with the forks in an offset rotated position, the sliding movement of the forks can be utilized to place the load directly in front of the vertical pivot, so that I am able to reduce the strain on the vertical pivot and carriage through the centering of the load.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 2 is a side view on the line 2—2 of Fig. 1.

Fig. 3 is similar to Fig. 1, but shows the load forks rotated and also moved laterally relatively to the pivot.

Fig. 4 shows a detail on the line 4—4 of Fig. 1.

Fig. 5 is a section on the line 5—5 of Fig. 4.

Figure 1:
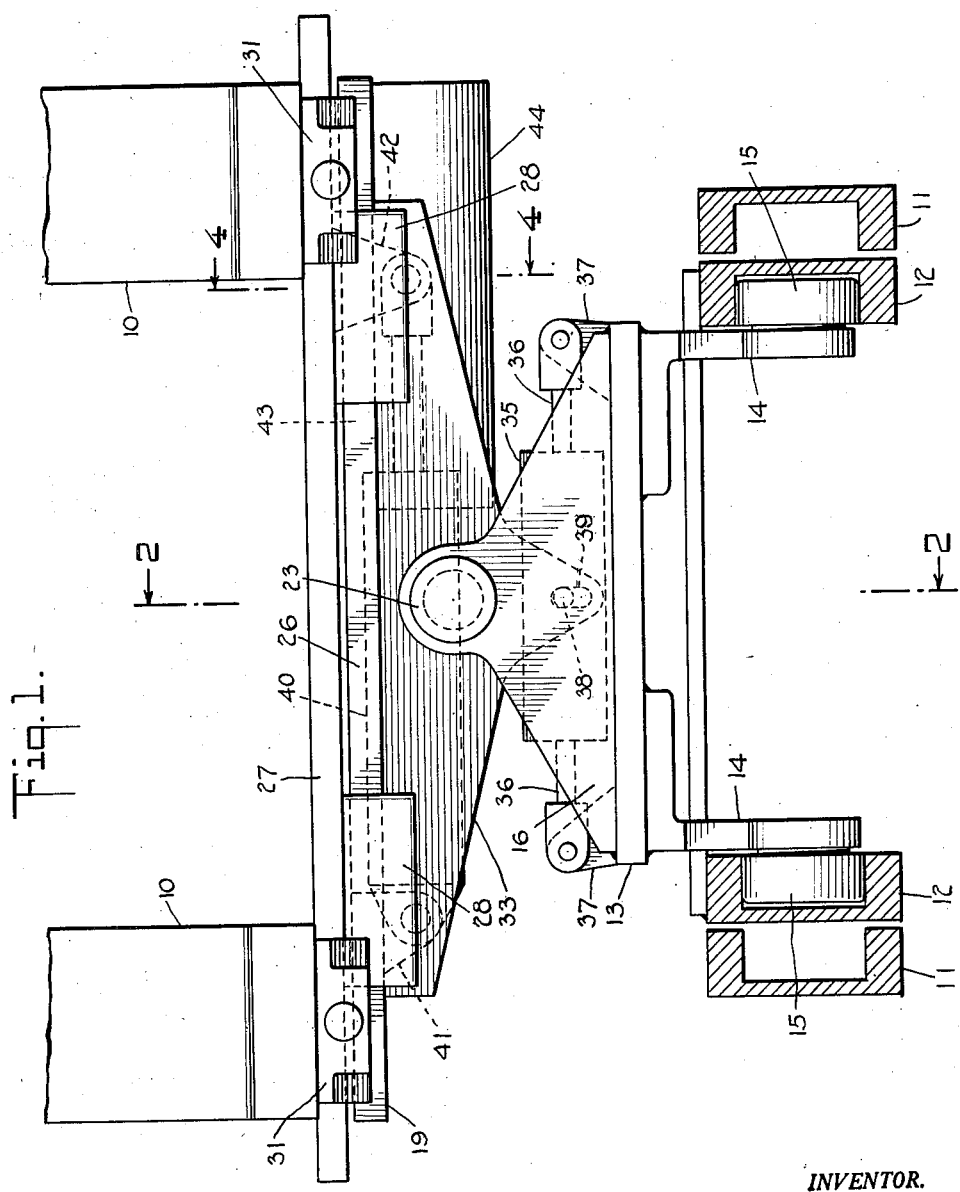
Fig. 1 is a plan view of my invention.

Referring now more particularly to Fig. 1 of the drawings, I show my novel construction supporting a pair of load forks 10 for vertical movement on the primary and secondary uprights 11, 12 of an industrial truck. These uprights 11, 12 may very well be of the type shown in my earlier Patent No. 2,505,009, but the particular details of the uprights and their mounting on the truck are not important to an understanding of my invention. I utilize in my novel construction a load carriage 13 that has a pair of rearwardly extending brackets 14 upon which are rollers 15. These rollers 15 are engaged in the channels of the uprights 12 whereby to mount the carriage 13 for vertical movement, as in my earlier patent. Upon the front of carriage 13 I mount a pair of upper and lower brackets 16, 17, best seen in Fig. 2. The brackets 16, 17 are formed at their forward ends with vertically aligned bearing openings, and are preferably equipped with intergral reinforcing members 18 through which the vertical openings extend.

The upper and lower carriage brackets 16, 17 of my novel structure support a load carrier that has as its main portion a vertical plate 19. On the rear surface of plate 19 are a pair of upper and lower brackets 20, 21 that are formed with vertical openings and equipped preferably with reinforcing members 22. Pivot pins 23 are engaged in the openings in the carriage brackets 16, 17 and carrier brackets 20, 21 whereby the carrier 19 is mounted to pivot from side to side on the load carriage 13. As actually shown, thrust bearings 24 and also bearing sleeves 25 are interposed between the pivot pins 23 and the brackets 16 and 20, but it should be realized that the particular details of the bearings are not important. It is necessary to understand principally that the carrier 19 rotates in a vertical axis that is maintained in a medial position relatively to the truck.

It will be observed that the vertical plate 19 of the load carrier has a horizontal upper edge portion 26 that is positioned somewhat above the upper bracket 20 and a short distance forwardly from the pivot axis. I utilize a fork mounting plate 27 upon which are a pair of rearwardly extending angle brackets 28, well shown in Fig. 1 and Fig. 4, that are engaged behind the upper edge portion 26 of the carrier plate 19. These angle brackets 28 are equipped with bearings 29 whereby they can slide on the edge portion 26, and I provide a bearing 30 on which fork mounting 27 slides relatively to the lower portion of carrier plate 19. Through this arrangement, the load carrier is equipped with horizontal ways that support the fork mounting plate 27 for sliding in a direction transverse to the pivot axis.

For the purposes of description, I show the load forks 10 attached to the vertical mounting plate 27 through conventional upper and lower brackets 31 and 32, best seen in Fig. 2. It is to be understood that the particular means through which forks 10 are attached to plate 27 are not important, and also that I may utilize plate 27 for mounting a load support other than a pair of forks. It is, of course, important to relaize that the structure I have thus far described enables the forks or load support to slide with their mounting plate 27 in a lateral direction relatively to the pivot axis, as represented by the pivots 23. The particular advantages of this construction will become more clearly apparent as the description proceeds.

To impart the rotating and sliding movements to the load forks 10, I prefer to utilize a particular arrangement of hydraulic rams. For this purpose, I mount an integral arm 33 on the load carrier 19, this arm 33 extending rearwardly beyond the pivot axis. The rear end of arm 33 prefearbly is equipped with an angular part 34, best seen in Fig. 2, so arranged that this end of arm 33 is U-shaped with opposed upper and lower parts. In a horizontal position between the opposed rear parts of the arm 33 is a hydraulic ram 35. This ram 35 has a double acting piston with a rod 36 extending at opposed ends of the ram, as shown in Fig. 1. The ends of piston rod 36 are attached to the front of the vertical carriage plate 13 through a pair of brackets 37, thereby mounting the ram 35 on the carriage. On the upper and lower sides of the ram 35 I provide pins 38, Fig. 2, that are engaged in slots 39 in the opposed parts of the carrier arm 33, 34. Thus, the ram 35 when actuated moves the arm 33 through the pins 38, and the arm 33 in turn rotates the carrier 19 and forks 10 on the pivots 23. I utilize further a ram 40 that acts between the carrier plate 19 and the fork mounting plate 27 for sliding the plate 27 and the forks 10 relatively to the carrier. I mount the ram 40 at one end upon the back of the carrier plate 19 through a bracket 41, Figs. 1 and 3, and I attach the opposed end of the ram 40 to the fork mounting 27 through a bracket 42, Figs. 1, 4, and 5. I prefer to position the ram 40 actually within a portion of the carrier plate 19, and to enable me to do this I form in the plate 19 a slot 43 that extends substantially from the ram bracket 41 through one end of the plate 19. I then reinforce the carrier plate 19 through a U-shaped member 44 that extends across slot 43, as will be understood from Figs. 4 and 5. Because of the particular arrangement of the ram 40, the forks can be rotated through a relatively wide angle without interference between the ram 40 and the load carriage 13.

The extremely novel structure that I have described enables the load forks 10 to be rotated in a horizontal direction relatively to the truck, thus facilitating very considerably the movement of the truck in narrow aisles. In addition, it is possible to align the forks 10 or a load upon the forks relatively to a position in which the load is to be deposited, even when the truck is not perfectly aligned with that position. The aligning movement of the forks is actually under very close control, because the forks can always be moved in a direction at right angles to their length regardless of their rotated position. My novel construction moreover enables the load, even when in a rotated position, to be carried with its center of gravity directly in front of the pivot axis. My invention thereby reduces very materially the strain on the pivots and the load carriage of the truck.

I believe that those skilled in the art will now understand that I have contributed an extremely novel pivoting and sliding construction for load forks. Through my novel construction, I am able to control much better the movements of the forks into predetermined aligned positions, and also to control better the positioning of a load relatively to the truck. I believe, therefore, that the very considerable advantages of my invention will be fully appreciated.

I now claim:

1. In a truck of the class described, a vertically moving load carriage, a load carrier, bearing means pivoting the load carrier medially thereof on a vertical pivot relatively to said load carriage, a hydraulic ram extending between said load carrier and carriage for moving the load carrier on said pivot means relatively to said carriage, a load support, means mounting said load support on said load carrier for sliding movement bodily in a transverse direction relatively to the carrier, and a hydraulic ram extending between said load support and load carrier for sliding said load support whereby to move a load on said support relatively to said load carrier and its pivot means.

2. In a truck of the class described, a vertically moving load carriage, a load carrier, bearing means pivoting the load carrier medially thereof on a vertical pivot relatively to said load carriage, a pair of forks, means mounting said forks on said load carrier for sliding movement bodily in a transverse direction relatively to the carrier, a hydraulic ram extending between said load carrier and carriage for rotating the load carrier and forks on said pivot means relatively to said carriage, and a hydraulic ram extending between said forks and load carrier for sliding said forks whereby to move a load on said forks relatively to said load carrier and vertical pivot in all rotated positions of the carrier and forks.

3. In a truck of the class described, a vertically moving load carriage, a load carrier, means mounting the load carrier to pivot on the load carriage in a vertical axis medially of the truck, a hydraulic ram extending between said load carrier and carriage for rotating the load carrier in said vertical axis relatively to said carriage, a pair of forks, means mounting said pair of forks for sliding movement bodily on said load carrier, and a hydraulic ram extending between said forks and load carrier for sliding said forks horizontally on their mounting relatively to said load carrier.

4. In a truck of the class described, a vertically moving load carriage, a load carrier, means mounting the load carrier to pivot on the load carriage in a vertical axis, a hydraulic ram extending between said load carrier and carriage for rotating the load carrier in said vertical axis relatively to said carriage, a load support, means mounting said load support on said load carrier for movement bodily relatively thereto in a horizontal direction, and a hydraulic ram extending between said load support and carrier for moving the load support whereby to move a load on the support relatively to the pivot axis in all rotated positions of the carrier.

5. In a truck of the class described, a vertically moving load carriage, a load carrier, means mounting the load carrier to pivot on the load carriage in a vertical axis, a load support extending longitudinally from said load carrier, means mounting said load support for transverse sliding movement on the carrier, a hydraulic ram extending between said load carrier and carriage for rotating the load carrier and load support relatively to said carriage in said vertical axis, and a hydraulic ram extending between said load support and carrier for sliding the load support on its mounting whereby to move the support in a direction at right angles to its length in all positions to which the support and carrier are rotated in said axis.

6. In a truck of the class described, a vertically moving load carriage, a load carrier, means mounting the load carrier to pivot on the load carriage in a vertical axis positioned medially of the truck, a load support extending longitudinally from said load carrier, means mounting said load support on the carrier for horizontal movement relatively thereto, a hydraulic ram extending between said load carrier and carriage for rotating the load carrier and load support relatively to said carriage in said pivot axis, and a hydraulic ram extending between said load support and carrier for moving the load support on its mounting whereby to effect movement of said support relatively to the pivot axis in all positions to which the support and carrier are rotated in said pivot axis.

7. In a truck of the class described, a vertically moving load carriage, a load carrier, means mounting the load carrier to pivot on the load carriage in a vertical axis positioned medially of the carrier, a pair of forks extending longitudinally from said load carrier, means mounting said pair of forks for sliding movement on the carrier in a horizontal direction, a hydraulic ram extending between said load carrier and carriage for rotating the load carrier and forks relatively to said carriage in said vertical axis, and a hydraulic ram extending between said forks and carrier for sliding the forks on their mounting whereby to move the forks relatively to the pivot axis in all positions to which the forks and carrier are rotated in said axis.

References Cited in the file of this patent

UNITED STATES PATENTS

| | | |
|---|---|---|
| 2,621,821 | Melin | Dec. 16, 1952 |
| 2,621,822 | Melin | Dec. 16, 1952 |
| 2,650,732 | Hartquist | Sept. 1, 1953 |
| 2,655,278 | Daniels | Oct. 13, 1953 |
| 2,682,350 | Garrett | June 29, 1954 |
| 2,720,993 | Lull | Oct. 18, 1955 |

FOREIGN PATENTS

| | | |
|---|---|---|
| 690,736 | France | June 24, 1930 |